United States Patent
Page

[11] 3,973,837
[45] Aug. 10, 1976

[54] CONTACT LENSES

[76] Inventor: Louis J. Page, 191-21 Hillside Ave., Hollis, N.Y. 11423

[22] Filed: May 23, 1973

[21] Appl. No.: 363,186

Related U.S. Application Data

[63] Continuation-in-part of Ser. No. 140,200, May 4, 1971, abandoned.

[52] U.S. Cl. ............................. 351/160; 351/161
[51] Int. Cl.² ........................................ G02C 7/04
[58] Field of Search ........................... 351/160–162

[56] References Cited
UNITED STATES PATENTS

| | | | |
|---|---|---|---|
| 2,117,770 | 5/1938 | Row | 351/160 |
| 2,241,415 | 5/1941 | Moulton | 351/162 |
| 2,247,628 | 7/1941 | Beitel | 351/160 |
| 2,369,758 | 2/1945 | Sheldon | 351/160 X |
| 2,393,266 | 1/1946 | Riddell | 351/160 |
| 3,102,157 | 8/1963 | Gamber | 351/160 |
| 3,220,960 | 11/1965 | Wichterle et al. | 351/160 X |
| 3,270,099 | 8/1966 | Camp | 351/161 X |
| 3,472,581 | 10/1969 | Bronstein | 351/161 |
| 3,485,244 | 12/1969 | Rosen | 351/160 |
| 3,488,111 | 1/1970 | Isen | 351/160 |
| 3,489,491 | 1/1970 | Creighton | 351/160 |
| 3,619,044 | 11/1971 | Kamath | 351/160 |

FOREIGN PATENTS OR APPLICATIONS

| | | | |
|---|---|---|---|
| 1,327,193 | 4/1963 | France | 351/160 |
| 701,970 | 1/1941 | Germany | 351/160 |
| 1,045,065 | 10/1966 | United Kingdom | 351/160 |

*Primary Examiner*—David H. Rubin

[57] ABSTRACT

A contact lens made of a relatively hard, non-hydrophilic material, arranged to re-surface the major portion of the cornea of the eye, said lens being provided with a liner made of a hydrophilic material which is arranged to cover a portion of the lens, so that only the hydrophilic liner comes in contact with the eye.

11 Claims, 6 Drawing Figures

CONTACT LENSES

This application is a continuation in part of my patent application Ser. No. 140,200, filed May 4, 1971, entitled CONTACT LENSES, and has an abandoned status.

This invention relates to contact lenses. Contact lenses generally are made of a relatively hard plastic material which is relatively stable and therefore lenses made of this material maintain their form and optical precision. There are disadvantages of lenses made of this material such as they are non-hydrophilic and hard. These lenses have the common fault that the wearer must adjust to accepting a foreign body (the contact lens) which can be very irritating. Many wearers never adjust to this type of contact lens and discard them after a time because of irritation to the cornea, sometimes causing an abrasion. Another disadvantage of contact lenses made of this material is that they reduce the supply of oxygen to the cornea since they do not allow gaseous or liquids to penetrate therethrough.

A newer type of contact lens is known generally as the hydrophilic lens. This lens is made of a hydrophilic material which becomes soft as a gel when hydrated and allows for the continuous exchange of gaseous and liquids therethrough. This type of lens is very comfortable to wear. These lenses have the common fault that the inside surface conforms itself to match the cornea and this change is carried through the material to the front surface. Since most eyes have corneal astigmatism, the hydrophilic lens partially transfers the astigmatic deformation of the cornea to the front surface of the lens and as a result the visual acuity is not as good as provided with the hard type lens.

One of the principle objects of my invention is to overcome these faults and disadvantages. Another object of my invention is to provide a lens in which the visual acuity is comparable to that of a hard lens and having the comfort of a hydrophilic lens. Another object of my invention is to provide a lens having a section of the hydrophilic component with a reading addition for presbyopes. Another object of my invention is to provide a lens in which the hard lens may be interchanged by the fitter or wearer, in a pocket provided in the hydrophilic member with different lenses for different purposes and the pocket acts as a bumper for the front surface of the lens.

These and other objects and advantages of my invention reside in the novel combination and arrangement of the parts which will be more fully understood from the accompanying drawing and the following description and claims.

Referring to the drawing.

Figure 1:
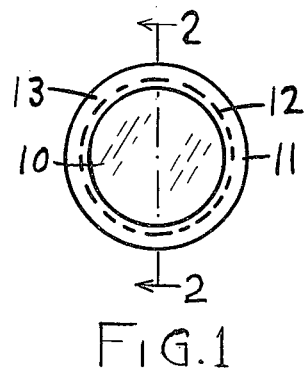
FIG. 1 is a plan view of a lens embodying my invention.

Referring to the drawing the same numbers designate similar parts in the different views. The relatively hard lens 10 will be referred to as the lens; the surface of the lens away from the surface of the eye will be referred to as the outer or convex surface and the surface of the lens adjacent the cornea of the eye as the inner or concave surface. Similarly the surfaces of the hydrophilic liner will be referred to in a like manner.

A preferred embodiment of my invention is disclosed in FIG. 1. The lens 10 is made of a relatively hard optical material so as to maintain its optical precision and of such a size to cover the major portion of the cornea. The inner surface of the lens is concavely formed to suitably fit the cornea. A hydrophilic liner 11 is arranged to extend continuously over the inner surface of the lens 10 and over the edge portion 12 and partially over the forward surface thereof as shown at 13 in FIG. 2. This arrangement also provides a means for the wearer of contact lenses to interchange lenses for different purposes in the pocket formed by the portion of the hydrophilic liner shown at 13. The hydrophilic liner 11 becomes soft and stretchable when hydrated, whereby the lens 10 is reaseably secured in the pocket formed in the hydrophilic member 11. The portion 13 of the hydrophilic liner 11 is arranged so that the surface dimension of the uncovered portion of the front surface of the lens 10 is relatively greater than the dimension of the portion 13 of the hydrophilic liner 11 extending thereover. The portion 13 of the hydrophilic liner can be formed having a different radius of curvature than that of the front surface of the lens 10 thereby providing a reading addition to the distant prescription in the lens so that the lens becomes a bifocal type lens for presbyopes. In this form the portion 13 is extended over the front surface of the lens 10 to a suitable extent whereby the border of the hydrophilic liner is sufficient in width to provide a reading area. The portion 13 of the hydrophilic liner can be arranged extending forwardly and beyond the front surface of the lens to such an extent that it acts as a bumper for the lens whereby should the lens be accidently dropped the hydrophilic liner protects the front surface of the hard lens from being scratched. The hydrophilic liner 11 can be attached to the lens 10 by any suitable means such as by fusion, thermal, adhesive, mechanical, solvent or spin casting.

Figure 2:
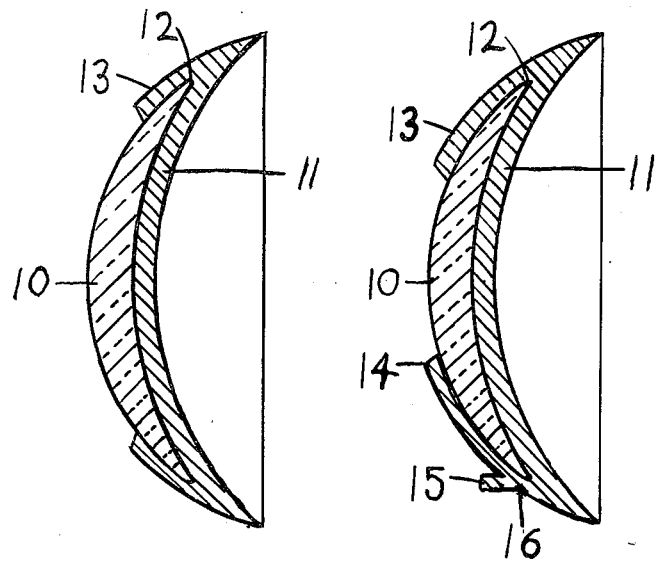
FIG. 2 is an enlarged sectional view taken on line 2—2 of FIG. 1.
Figure 4:
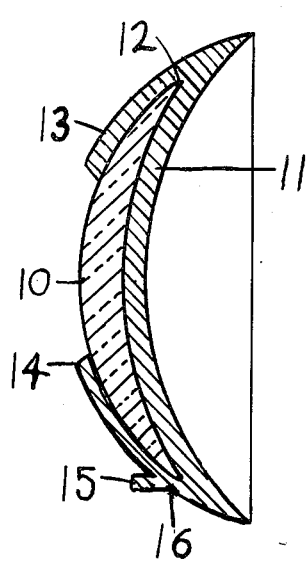
FIG. 4 is an enlarged sectional view taken on line 4—4 of FIG. 3.

In applicants contact lens it should be noted the hard lens supports the hydrophilic liner and re-enforces it. In ophthalmology hydrophilic contact lenses are employed as moist bandages and for other therapeutic treatments of the cornea since hydrophilic materials retain medications and provide a means for liquids to pass therethrough. When the usual hydrophilic lenses are used for therapeutic treatment of diseases of the cornea these lenses in some instances are not sufficiently durable or stable to withstand the actions of the medications and are not sufficiently supporting to the tissue of the corneas. In applicants lens the portion 13 of the hydrophilic liner 11 extending over the front surface of the lens forms a chamber or well around the inner edge portion thereof as shown in FIGS. 2 and 4 when the lens is placed in position on the eye and the head is in a reclining position. Medication can be instilled into this well and it will gradually penetrate the hydrophilic liner, thereby providing a time release absorption of the medication in the treatment of corneal diseases, and tissue supporting.

Figure 3:
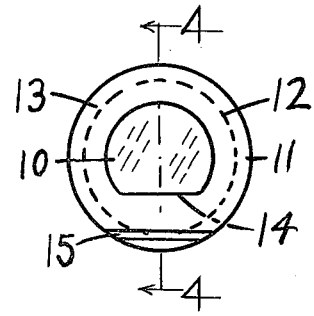
FIG. 3 is a plan view of a modified form of my invention.

In FIG. 3, the lens 10 is provided with the hydrophilic liner 11 and a section of the portion 13 is arranged having a segment as shown at 14 in FIGS. 3 and 4. The section 14 is provided with a reading prescription (addition) for presbyopes. The top edge of the reading section 14 can be shaped in any suitable form but I prefer to make it substantially flat as shown in FIG. 3 at 14 and of such a height that the wearer can look over the edge thereof for distant viewing. In this arrangement the portion of the liner 11 above the top edge of the segment 14 can be of the same prescription as the lens which is for distant vision. At the lower part of the reading section 14 a lip 15 shown in FIG. 4 is provided which extends forwardly from the point 16 as shown in the FIG. 4 at 16. In FIG. 4 the lip 15 is shown spaced relative to the edge of the hydrophilic liner 11. The lip 15 may be arranged at any suitable position relative to the edge of the lens and extend forwardly from the front surface of the supporting surface of the hydrophilic liner to any suitable extent. The lip 15 is arranged to rest on the edge of the lower eyelid and extend along a portion thereof when the lens is placed on the eye thereby preventing the lens from rotating relative to the eye. When the lens 10 is placed on the eye the lip 15 rests on the edge of the lower eyelid and when the eyes are lowered relative to the eyelid for reading the lower eyelid holds the lens up relative to the eye so that the relative position of the eyes to the lens is such that the reading section of the lens is positioned over the pupil of the eye and in proper position for reading. Since the lip 15 prevents the lens from rotating it can be incorporated in a single vision contact lens or hydrophilic contact lens in which a cylinder is required to correct residual astigmatism.

Figure 5:
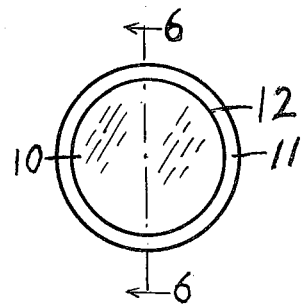
FIG. 5 is a plan view of another modified form of my invention.
Figure 6:
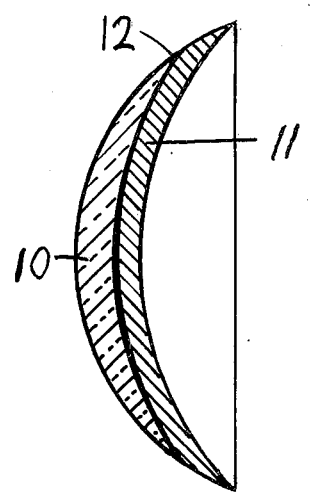
FIG. 6 is an enlarged sectional view taken on line 6—6 of FIG. 5.

In FIGS. 5 and 6 the lens 10 is provided with the hydrophilic liner 11 extending continuously along the inner surface of the lens and beyond the peripheral edge portion thereof. The portion of the liner 11 extending beyond the edge portion 12 of the lens is arranged to taper therefrom to the peripheral edge of the liner 11 so that such tapering portion blends into the general contour of the lens. This arrangement provides relatively greater strength at the point it extends beyond the edge of the lens and relatively greater flexibility toward the periphery thereof. The front surface of the lens 10 and the front surface of the portion of the hydrophilic liner 11 which extends beyond the edge of the lens are arranged to lie in substantially the same peripheral arc as shown in FIG. 6 and having the peripheral edge portion of these components lie in substantially the same arc so that there is a continuity of these surfaces. This arrangement provides for greater comfort and relatively less visual interference from these edges since the peripheral edges of the two components blend into each other.

From the forgoing it can be seen I have provided a contact lens in accordance with the objects of my invention in which the visual acuity is comparable to that of the hard type contact lens and the comfort is comparable to the hydrophilic type contact lens. It should be pointed out that the method of removal of my contact lens is similar to that of the hard contact lens.

In the several views applicant has shown the preferred arrangements of his invention and does not limit himself to these applications. It is understood that other modifications might be conceived embodying the general principles of this invention.

I claim:

1. A corneal type contact lens made of a relatively firm optical material, said lens being of such a size to cover the major portion of the cornea and limited to an area within the cornea, the front surface being convex and the surface toward the cornea concavely formed to suitably fit thereon, the front and rear surfaces of said lens, at the peripheral edge portion tapering toward each other forming an acute angle situated within the limits of the cornea, means for providing a liner for said lens, said liner being made of a hydrophilic material and arranged to extend along the concave surface of the lens and continued over and beyond the edge portion thereof in a continuous and integral form, and the front surface dimension of the hydrophilic liner extending over and beyond the edge portion of said lens being relatively smaller than the dimension of the diameter of the front surface of the lens, and the arc of the convex surface of the hydrophilic liner extending from the peripheral edge portion thereon toward the peripheral edge of the lens continues thereover having a substantially continuous radius of curvature, whereby said hydrophilic liner provides a relatively soft and smooth surface for the tissue of the cornea and eyelids to rest against when hydrated, and said lens re-surfaces the major portion of the cornea thereby providing a means for correcting errors of refraction comparable to that of a hard contact lens and the hydrophilic liner providing the comfort of a hydrophilic contact lens.

2. A corneal type contact lens as set forth in claim 1, having a portion of the hydrophilic liner extending partially over the front surface of the lens in the form of a border, said border extending sufficiently inwardly from the peripheral edge portion of the lens, so that at least a portion of the border of the liner is situated within the limits of the cornea and the inner circumference thereof being substantially larger than the circumference of the pupil of the eye.

3. A contact lens as set forth in claim 1, wherein the portion of the hydrophilic liner extending partially over the front surface of said lens to a relatively substantial amount forms a pocket having an opening in the front surface thereof, said pocket being arranged to releasably secure said lens therein, so that said lens is interchangeable by the wearer with other lenses in said pocket when said hydrophilic liner, in a hydrated state, is soft and stretchable, whereby lenses for different purposes can be interchanged by the wearer.

4. A contact lens as set forth in claim 2, wherein the front surface of the hydrophilic border is provided with a radius of curvature different from that of the front surface of the lens, so that the hydrophilic border incorporates a lens power suitable as a reading addition to the power of the lens, whereby the lens becomes a bifocal lens.

5. A contact lens as set forth in claim 2, wherein at least a portion of the hydrophilic border is provided with a refractive power different from the refractive power of the central portion of the lens, so that the portion of the lens above said border is for distant vision and the portion of the lens below the top edge of the border is for near vision.

6. A contact lens as set forth in claim 5, wherein the hydrophilic liner projects forwardly of the front surface of the lens when hydrated and is arranged to rest along the edge of the lower eyelid when worn, and when hydrated projects forwardly thereof, so that the lens is prevented from rotating when worn and when the eyes are lowered for reading vision the lower eyelid holds the lens up relative to the eye.

7. A contact lens as set forth in claim 1, wherein the portion of the hydrophilic liner extending beyond the edge portion of the lens is arranged to taper therefrom to the peripheral edge of the liner so that the hydrophilic liner has relatively greater strength at the point it extends from the edge of the lens and relatively greater flexibility toward the periphery thereof and having the peripheral edge portion of the lens and liner lying in substantially the same arc so that there is a continuity of these surfaces.

8. A corneal type contact lens having convex and concave surfaces is provided with a liner made of a hydrophilic material, said liner extending continuously along the concave surface of the lens and continued over the edge portion in the form of a skirt and partially over the convex surface in the form of a border, said border projecting forwardly of the surface of the lens when dehydrated, the convex surface of said border extending continuously from the peripheral edge to the inner peripheral edge thereon and having the inner peripheral edge situated between the area of the cornea covering the pupil of the eye and the limbal edge of the cornea, and the outer and inner portions of said liner being integrally formed.

9. A contact lens as set forth in claim 2, wherein the hydrophilic liner extending over the front surface of the lens is arranged to extend forwardly of the lens to such an extent so that a void is provided between the front surface of the lens and a surface the liner may contact whereby the front surface of the lens is protected against being scratched.

10. A corneal type contact lens made of a relatively firm optical material, the front surface of said lens being convex and the surface toward the cornea concavely formed to suitably fit thereon, said lens being provided with a hydrophilic liner extending over the concave surface thereof and continued over the edge portion of the lens and partially over the convex surface forming a skirt, the front surface of said skirt projecting forwardly of the front surface of said lens when dehydrated, so that a means defining a chamber or well is formed between the inner edge of the skirt of the hydrophilic liner extending thereover and the convex surface of the lens and said chamber being situated within the limits of the cornea, said skirt serving as a wick means for the liner extending over the concave surface of the lens thereby providing a time release dispenser for drugs instilled into said chamber, whereby drugs will seep through the liner to the portion of the liner covering the cornea, when the lens is worn, thereby time releasing drugs over the cornea.

11. A corneal type contact lens made of a relatively firm optical material, said lens being of such a size to cover the major portion of the cornea and limited to the area of the cornea and provided with convex and concave surfaces, the concave surface being arranged to suitably fit the cornea, means for providing a liner for said lens, said liner being made of a hydrophilic material and arranged to extend continuously along the concave surface of the lens and over and beyond the peripheral edge thereof in a continuous and integral form, and arranged so that the convex and concave surfaces of said lens meet at a point along the surface of the liner adjacent the concave surface of said lens, said point being situated within the limits of the cornea.

* * * * *